United States Patent [19]

Romenesko

[11] 4,163,082
[45] Jul. 31, 1979

[54] U.V.-RADIATION METHOD FOR DECREASING SURFACE TACK OF DISPOSED ORGANOPOLYSILOXANE GREASES AND GELS

[75] Inventor: David J. Romenesko, Midland, Mich.

[73] Assignee: Dow Corning Corporation, Midland, Mich.

[21] Appl. No.: 953,515

[22] Filed: Oct. 23, 1978

[51] Int. Cl.$^2$ .................. C08F 30/08; C08L 43/04
[52] U.S. Cl. .................. 428/447; 204/159.13; 427/44; 427/54; 427/58; 427/96; 427/407 R; 428/429; 428/448; 428/450; 428/451; 428/452
[58] Field of Search .................. 204/159.13; 260/827; 427/44, 54, 407 R; 428/447, 448

[56] References Cited

U.S. PATENT DOCUMENTS

| 3,076,726 | 2/1963 | Ault et al. | 117/155 |
| 3,726,710 | 4/1973 | Berger et al. | 427/54 |
| 4,048,356 | 9/1977 | Bakos et al. | 427/379 |
| 4,064,027 | 12/1977 | Gant | 204/159.13 |
| 4,070,526 | 1/1978 | Colguhoun et al. | 428/537 |
| 4,073,967 | 2/1978 | Sandvig | 427/44 |
| 4,098,840 | 7/1978 | Yoshida et al. | 260/827 |
| 4,107,390 | 8/1978 | Gordon et al. | 428/447 |
| 4,116,786 | 9/1978 | Hodakowski | 204/159.13 |

Primary Examiner—Richard B. Turer
Attorney, Agent, or Firm—George A. Grindahl

[57] ABSTRACT

The surface tack of a silicone gel or grease which is adheringly disposed on a substrate is decreased by coating the surface of the disposed gel or grease with a U.V.-curable organopolysiloxane liquid composition and exposing the coating to ultraviolet light until it is converted to a solid, non-tacky state. The U.V.-curable organopolysiloxane liquid composition comprises a curable mixture of an organopolysiloxane bearing olefinic radicals and an organopolysiloxane bearing silicon-bonded hydrogen radicals and/or silicon-bonded mercaptoalkyl radicals. The cured organopolysiloxane coating is easily penetrated, if desired, to provide access to the tacky silicone.

8 Claims, No Drawings

U.V.-RADIATION METHOD FOR DECREASING SURFACE TACK OF DISPOSED ORGANOPOLYSILOXANE GREASES AND GELS

BACKGROUND OF THE INVENTION

This invention relates to a process for coating a disposed silicone gel or grease.

It is known to dispose a tacky silicone gel or grease (also called a compound) on an electrical device, such as on a crimp-on electrical connector for the purposes of coating and protecting an electrical junction that is established or maintained during the use of the connector or on an electrical circuit board to protect components and connections thereon against damage by corrosion, vibration, mechanical shock and the like. The sticky nature of the tacky silicone gel or grease is used to establish adhesion between the silicone material and the substrate on which it is placed. The gel- or grease-like nature of the tacky silicone is used to permit deformation and limited flow of the silicone material under stress, such as during its application to the substrate, during use of a treated electrical connector or during invasive testing or repair of a coated circuit board, and yet prevent flow of the disposed gel or grease away from the substrate.

However, the exposed surface of the disposed tacky silicone grease or gel, in many cases, need not be sticky and therefore unnecessarily presents problems. For example, unless covered, the sticky surface will collect dirt, the presence of which is usually undesirable for operational and/or aesthetic reasons. Additionally, a small substrate which bears exposed gel or grease will tend to stick in undesirable locations unless it is specially packaged and/or handled. In particular, a plurality of grease- or gel-containing electrical connectors tend to aggregate when handled in bulk form in the absence of further precautions.

It is further known to coat a disposed tacky silicone gel or grease with a moisture- or heat-curable, liquid organopolysiloxane composition and thereafter allow the coating to cure to a solid non-tacky state, thereby providing a solution to the sticky problems noted above. However, said curable, liquid organopolysiloxane compositions have one or more deficiencies, such as a slow cure rate or the presence of a solvent or the need for heat to effect a cure, that makes their use less-than-optimum.

SUMMARY OF THE INVENTION

It is an object of this invention to provide a process for rapidly coating a disposed tacky silicone gel or grease with a solid, non-tacky organopolysiloxane, thereby reducing the surface tack of the disposed gel.

This object and others are achieved by coating the disposed tacky silicone gel or grease with a liquid organopolysiloxane composition, which is convertible by ultraviolet radiation to the solid state, and exposing the coating to a curing amount of ultraviolet radiation.

The cured organopolysiloxane coating provides a non-tacky surface on the tacky silicone gel or grease which is easily compromised, i.e. penetrated, to permit access to the gel or grease and yet is sufficiently strong and adherent to prevent exposure of the gel or grease incidentally during handling, packaging, etc. of the substrate.

It was surprising to find that the liquid organopolysiloxane compositions of the art, which are taught to be coating compositions for solid substrates and adhesive release coatings, would be useful for coating a gel or grease which is a semi-solid material having adhesive properties.

DETAILED DESCRIPTION OF THE INVENTION

This invention relates to a process for reducing the surface tack of a tacky organopolysiloxane gel or grease, adheringly disposed on a substrate, said process comprising (I) applying to the surface of said disposed gel or grease a continuous layer of a liquid organopolysiloxane composition which is convertible by ultraviolet radiation to the solid state and which consists essentially of a mixture of (a) an organopolysiloxane wherein an average of at least two of the organic radicals per molecule are silicon-bonded olefinic radicals selected from the group consisting of vinyl and butenylene and (b) a hydrogen-containing organopolysiloxane, free of aliphatic unsaturation, wherein the average molecule contains at least two hydrogen radicals selected from the group consisting of silicon-bonded hydrogen and mercaptoalkyl hydrogen, at least one of (a) and (b) having an average of more than two of said olefinic radicals and said hydrogen radicals, respectively, per molecule and (II) exposing the applied continuous layer of convertible liquid to ultraviolet radiation until it is converted to a continuous layer of solid organopolysiloxane.

Organopolysiloxane gels and greases (also called compounds in the art) are well known in the silicone industry and in other arts, such as the electrical art, and need no detailed description here.

Generally, organopolysiloxane greases comprise an organopolysiloxane fluid of suitable viscosity, for example up to 30 pascal-seconds, a shear stability additive such as boric acid, and a thickening agent such as silica, clay or alumina, to render the fluid non-flowing under the influence of gravity. Other suitable components, such as colorants, anti-corrosion additives and solvents may also be present. The organopolysiloxane fluid used therein usually comprises a mixture of organopolysiloxanes having various viscosities and/or organic radicals and/or terminating radicals; however, said fluid may also be a single organopolysiloxane.

A typical organopolysiloxane grease composition may include, for example, 100 parts of a trimethylsiloxane-endblocked polydimethylsiloxane having a viscosity of 1 pascal-second at 25° C., 10 parts of fume silica having a surface area of greater than 100 m$^2$/g and up to 10 parts of a hydroxyl-endblocked polydiorganosiloxane fluid having up to 10 siloxane units per molecule and bearing silicon-bonded phenyl and/or methyl groups. Examples of commercially available greases suitable for use in the electrical industry and in the process of this invention include Dow Corning® 4 Compound and Dow Corning® 111 Compound sold by Dow Corning Corporation.

Generally, organopolysiloxane gels are merely organopolysiloxane fluids which are made resistant to flow under the influence of gravity by moderate crosslinking of the fluid. Said crosslinking may be accomplished in any of a number of suitable processes, such as by irradiation, with ionizing radiation, of a permethylated siloxane fluid, or by chemical reaction of suitably reactive radicals, such as silicon-bonded vinyl radicals and silicon-bonded hydrogen radicals in the fluid molecules, or by including small amounts of —SiO$_{3/2}$ and SiO$_{4/2}$ siloxane units in a predominantly polydiorganosiloxane molecule during preparation of the fluid.

A typical organopolysiloxane gel of the chemically crosslinked type may, for example, be prepared by mixing 91 parts of a trimethylsiloxane-endblocked polydimethylsiloxane comprising 1 percent methylvinylsiloxane units and having a viscosity of 750 millipascal-seconds at 25° C., 9 parts of a copolymer containing methylsiloxane units, dimethylsiloxane units and trimethylsiloxane units and having a viscosity of 50 millipascal-seconds at 25° C., 0.5 parts of a hydrogen-endblocked polydimethylsiloxane fluid having approximately 20 siloxane units and a platinum catalyst effective to gel the mixture.

The particular organopolysiloxane gel or grease to be coated by the process of this invention is not critical but merely possesses a tacky surface that can be advantageously treated by this process.

By a tacky surface it is meant a surface that possesses sufficient adhesive character to collect and retain foreign objects, such as dirt particles and metal slivers, or to adhere to a substrate against the influence of gravity when disposed thereon or to adhere to another surface of the same kind when placed in extensive contact therewith, or the like.

Organopolysiloxane gels and greases may be adheringly disposed on a suitable substrate in any manner. For example, where appropriate, an organopolysiloxane may be disposed as a flowable composition and subsequently gelled in-place. Alternately, a gel or grease may be preformed and thereafter disposed on a substrate. Disposing may be accomplished by molding, brushing, flowing, pouring, spraying, dropping, extruding, etc. By adheringly disposed it is meant that the gel or grease is placed in contact with the substrate so that it will not separate therefrom under the influence of gravity.

The substrate to which the organopolysiloxane gel or grease is adheringly disposed is not critical and may be any solid surface such as metal, glass, wood, concrete, paper and plastic. Examples of suitable substrates include disconnect junctions in wiring systems, battery terminals, electrical assemblies, circuit boards, capacitors, coils, insulators and connectors.

A substrate of particular interest in the process of this invention is a connector that is applied to a plurality of metallic electrical conductors, such as wires, in electrical contact to maintain said contact. Such a connector is typically applied to the region of said electrical contact by a crimping action using an appropriate tool or by hand using an inserting or twisting action. During the application of the connector the organopolysiloxane gel or grease is caused to cover at least a portion of the conductors in electrical contact, thereby providing protection for the contact against corrosion.

Liquid organopolysiloxane compositions convertible by ultraviolet radiation to the solid state (herein also labeled the convertible organopolysiloxane composition) which are suitably operative in the process of this invention must experience a change to the solid, i.e. non-tacky, state when exposed to ultraviolet radiation. Compositions meeting this requirement comprise a liquid homogeneous mixture of two types of organopolysiloxanes; (a) an organopolysiloxane bearing an average of at least two reactive olefinic radicals per molecule and (b) an organopolysiloxane bearing an average of at least two reactive hydrogen radicals per molecule. In addition, at least one of said organopolysiloxanes has an average of more than two, preferably three or more, of said reactive radicals per molecule. Preferably both component (a) and component (b) have an average of three or more of said reactive olefinic radicals and reactive hydrogen radicals, respectively, per molecule.

Reactive olefinic radicals include the silicon-bonded vinyl radical and the butenylene radical, divalently bonded to one silicon atom. Butenylene includes —CH$_2$CH=CHCH$_2$— and —CH=CHCH$_2$CH$_2$— radicals bonded to silicon as follows:

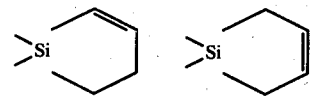

The group consisting of butenylene radical divalently bonded to one silicon atom, and depicted above, is designated the silacyclopentane group.

Reactive hydrogen radicals include the silicon-bonded hydrogen radical and the alkylmercapto-bonded hydrogen radical, as it occurs in a radical of the formula —C$_n$H$_{2n}$SH. The value of n may be an integer from 1 to 6, giving rise to mercaptoalkyl radicals such as mercaptomethyl, 2-mercaptoethyl, 3-mercaptopropyl, 3-mercaptobutyl and 4-mercaptobutyl.

Organopolysiloxanes (a) and (b) each consist of a plurality of siloxane units of the general formula R$_a$SiO$_{(4-a)/2}$ wherein a is an integer less than 4 and represents the number of silicon valences bonded to R radicals. The value of a is equal to the number of R radicals bonded to the silicon atom when all R radicals are monovalently bonded thereto and is equal to one plus the number of R radicals bonded to the silicon atom when the silicon atom bears a butenylene radical.

Herein, R denotes an organic radical having from 1 to 6 carbon atoms selected from the group consisting of alkyl radicals, such as methyl, ethyl, propyl and isopropyl; cycloaliphatic radicals, such as cyclopentyl and cyclohexyl; haloalkyl radicals, such as 3-chloropropyl and 3,3,3-trifluoropropyl; haloaromatic radicals, such as 2,4-dichlorophenyl; and a reactive radical selected from the group consisting of vinyl, butenylene, hydrogen and mercaptoalkyl, as delineated above. No organopolysiloxane molecule bears more than trace amounts of both reactive olefinic radicals and reactive hydrogen radicals. Preferably no siloxane unit of the organopolysiloxanes bears more than one of said reactive radicals.

Organopolysiloxanes (a) and (b) may be composed of any combination of siloxane units of the formulae R$_3$SiO$_{1/2}$, R$_2$SiO$_{2/2}$, RSiO$_{3/2}$, and SiO$_{4/2}$, bonded together by Si—O—Si bonds, provided that their mixture to form the convertible organopolysiloxane composition results in a liquid at room temperature. Preferably, both component (a) and component (b) are liquids at room temperature.

Herein Me, Et, i-Pr, Ph, Vi and C$_6$H$_{11}$ denote the methyl, ethyl, isopropyl, phenyl, vinyl and cyclohexyl radical, respectively and Bt denotes the divalent butenylene radical.

Examples of suitable siloxane units for either component (a) or (b) are endblocking triorganosiloxane units, such as Me$_3$SiO$_{1/2}$, PhMe$_2$SiO$_{1/2}$, EtMe$_2$SiO$_{1/2}$, C$_6$H$_{11}$Me$_2$SiO$_{1/2}$, CF$_3$CH$_2$CH$_2$Me$_2$SiO$_{1/2}$, C$_6$H$_3$Cl$_2$Me$_2$SiO$_{1/2}$, i-PrMe$_2$SiO$_{1/2}$, PhEtMeSiO$_{1/2}$ and Ph$_2$MeSiO$_{1/2}$; backbone diorganosiloxane units, such as $Me_2SiO_{2/2}$, $PhMeSiO_{2/2}$, $CF_3CH_2CH_2MeSiO_{2/2}$, $Ph_2SiO_{2/2}$, $ClCH_2CH_2CH_2MeSiO_{2/2}$ and $C_6H_{11}MeSiO_{2/2}$; and branching monoorganosiloxane units, such as $MeSiO_{3/2}$, $PhSiO_{3/2}$, $EtSiO_{3/2}$, $CF_3CH_2CH_2SiO_{3/2}$, $ClCH_2CH_2CH_2SiO_{3/2}$ and $C_6H_{11}SiO_{3/2}$; and $SiO_{4/2}$.

Examples of suitable siloxane units for component (a) only bearing reactive olefinic radicals include $Me_2ViSiO_{1/2}$, $PhMeViSiO_{1/2}$, $CF_3CH_2CH_2MeViSiO_{1/2}$, $MeBtSiO_{1/2}$, $MeViSiO_{2/2}$, $PhViSiO_{2/2}$, $CF_3CH_2CH_2ViSiO_{2/2}$, $BtSiO_{2/2}$ and $ViSiO_{3/2}$.

Examples of suitable siloxane units for component (b) only bearing silicon-bonded hydrogen radicals include $HMe_2SiO_{1/2}$, $HPhMeSiO_{1/2}$, $HMeCF_3CH_2CH_2SiO_{1/2}$, $HMeSiO_{2/2}$, $HPhSiO_{2/2}$, $HCF_3CH_2CH_2SiO_{2/2}$ and $HSiO_{3/2}$.

Examples of suitable siloxane units bearing alkyl-mercapto-bonded hydrogen radicals for component (b) include $HSCH_2CH_2CH_2Me_2SiO_{1/2}$, $HSCH_2CH_2CH_2MeSiO_{2/2}$ and $HSCH_2CH_2CH_2SiO_{3/2}$.

It is also within the scope and spirit of this invention to allow, in components (a) and (b), small amounts of non-essential radicals such as silicon-bonded hydroxy, methoxy, ethoxy and isopropoxy radicals. These radicals are usually bonded to endblocking siloxane units by design or are present on any siloxane unit as a residual radical arising from the particular process that was used to prepare the component. Preferably components (a) and (b) are free of said non-essential radicals.

Organopolysiloxanes (a) and (b) may be prepared by any suitable method. Generally, hydrolyzable organosilanes of the general formula $R_aSiX_{4-1}$ may be combined in the proper amounts and hydrolyzed to form a hydrolyzate which is equilibrated using an acidic or alkaline catalyst. Herein a is as denoted above and X denotes a hydrolyzable radical such as halogen radical such as chloro or bromo, an alkoxy radical such as methoxy or ethoxy, an acyloxy radical such as acetoxy or a silicon-nitrogen-bonded radical such as methylethylketoximo, dimethylamino or N-methylacetamido. Polydiorganosiloxanes are also conveniently prepared by catalytic ring-opening of cyclopolydiorganosiloxanes in the well-known manner.

Specific methods for preparing organopolysiloxanes bearing silicon-bonded vinyl radicals or silicon-bonded hydrogen radicals are well-known in the art and need no further documentation herein.

Specific methods for preparing organopolysiloxanes bearing silicon-bonded mercaptoalkyl radicals may be found in U.S. Pat. No. 3,632,715; 3,873,499; 4,046,795; 4,052,529 and 4,064,027 the disclosures of which are hereby incorporated herein by reference to show the preparation of some suitable mercaptoalkyl-containing organopolysiloxane.

Specific methods for preparing organopolysiloxanes bearing silicon-bonded butenylene radicals may be found in U.S. Pat. No. 3,509,191, the disclosure of which is hereby incorporated herein by reference to show the preparation of some suitable butenylene-containing organopolysiloxanes.

The convertible organopolysiloxane compositions preferably contain a photosensitizer to decrease the time that is needed to convert the organopolysiloxane composition from the liquid to the solid state, under the influence of ultraviolet radiation. Photosensitizers are well known in the art and include, for example, acetophenone, benzophenone, propiophenone, xanthone, anthraquinone, fluorenone, 3-methylacetophenone, 3-bromoacetophenone, 4-methylbenzophenone, benzaldehyde, carbazole and triphenylamine. The amount of any particular photosensitizer to be used in this invention is merely an amount sufficient to photosensitize the system, as indicated by a decreased time for non-tacky film formation. Generally, an amount of up to 5 percent by weight of photosensitizer, based on the total amount of components (a) and (b), is sufficient.

The convertible organopolysiloxane compositions are liquid at room temperature, i.e. they flow. The viscosity of the liquid mixture is not critical and may range from a few millipascal-seconds up to 100 pascal-seconds at 25° C. A preferred viscosity of the convertible organopolysiloxane composition to be used for any particular coating process may be determined by routine experimentation.

Generally, elastomeric coatings are obtained from convertible organopolysiloxane compositions wherein component (a) and component (b) are free of $RSiO_{3/2}$ and $SiO_{4/2}$ siloxane units and the total of all reactive radicals in (a) plus (b) does not exceed 10 percent of all the R radicals therein. As the number of $RSiO_{3/2}$ and $SiO_{4/2}$ siloxane units and/or the percentage of reactive radicals therein are increased more-resinous coatings are obtained.

In one preferred embodiment of this invention the convertible organopolysiloxane composition consists essentially of a mixture of (a) an organopolysiloxane selected from the group consisting of cyclopolymethylvinylsiloxanes having from 3 to 10 silicon atoms and 1,1'-oxy-bis(1-methyl-1-silacyclopentene), (b) a triorganosiloxane-endblocked polydiorganosiloxane fluid having a viscosity of from 0.5 to 50 pascal-seconds at 25° C. and containing up to 10 mol percent of methyl-3-mercaptopropylsiloxane units and at least 90 mol percent dimethylsiloxane units and (c) a photosensitizing amount of benzophenone, the amounts of (a) and (b) being sufficient to provide a mol ratio of mercaptopropyl radicals to olefinic radicals of from 0.5 to 5.0. This convertible organopolysiloxane composition provides an elastomeric organopolysiloxane coating.

In another preferred embodiment of this invention the convertible organopolysiloxane composition consists essentially of (a) a triorganosiloxane-endblocked polydiorganosiloxane fluid having a viscosity of from 0.5 to 50 pascal-seconds at 25° C. and containing up to 10 mol percent methylvinylsiloxane units and at least 90 mol percent dimethylsiloxane units, (b) a triorganosiloxane-endblocked polymethylhydrogensiloxane having approximately 35 silicon atoms and (c) a photosensitizing amount of benzophenone, the amounts of (a) and (b) being sufficient to provide a mol ratio of silicon-bonded hydrogen radicals to silicon-bonded vinyl radicals of from 1.0 to 10.0. This convertible organopolysiloxane composition provides an elastomeric organopolysiloxane coating which is free of sulfur atoms.

Examples of UV-curable organopolysiloxane compositions that are suitable for use in this invention as the convertible organopolysiloxane composition may be found in U.S. Pat. Nos. 3,873,499; 4,052,529; 4,064,027 and 4,107,390, the disclosures of which are incorporated herein to show the preparation of suitable convertible organopolysiloxane compositions.

The viscosity of the UV-curable organopolysiloxane composition may be established by a suitable selection of viscosities of the component organopolysiloxanes and/or by the use of thinning solvents. For operational and environmental reasons it is preferred to omit solvents from the composition; however, if used in the UV-curable composition it is preferred that any solvent be removed therefrom prior to the UV-curing process.

In the process of this invention the liquid organopolysiloxane composition, convertible by ultraviolet radiation to the solid state, is applied to the surface of the organopolysiloxane gel or grease after said gel or grease has been adheringly disposed on a substrate. In order to take full advantage of this process it is necessary to apply the liquid convertible composition in a continuous layer on the entire surface of the gel or grease. If desired, the coating may extend beyond the surface of the disposed gel or grease onto the substrate.

The thickness of the coating of convertible liquid composition on the silicone gel or grease may vary from a few micrometers to approximately a millimeter. Coatings having a thickness of less than a few micrometers may be unsuitable because of insufficient strength of the cured coating to provide protection for the gel or grease. Coatings having a thickness of greater than approximately a millimeter may be unsuitable because of an excessively long cure time of the applied liquid and/or because of excessive strength of the to-be-penetrated cured coating.

The convertible organopolysiloxane composition may be applied to the adheringly disposed gel or grease in any suitable manner such as by dripping, spraying, brushing, pouring and immersion. The particular application method that is selected will depend upon the viscosity of the convertible organopolysiloxane composition to be applied and the desired thickness of the coating, as is well known.

The continuous coating of convertible organopolysiloxane composition shold be exposed to ultraviolet radiation and thereby converted to the solid state as soon as possible to prevent loss or excessive thinning of the coating. Said exposure is continued until the coating has become tack free and has attained a sufficient degree of cure to provide a desired level of strength.

It is within the scope and spirit of this invention to apply more than one layer of convertible organopolysiloxane composition to the gel or grease, following each application with UV exposure, if desired to build a coating of solid organopolysiloxane having desirable properties.

Ultraviolet (UV) radiation, as used herein, is electromagnetic radiation having one or more wavelengths between 200 and 400 nm. Convertible organopolysiloxane liquid compositions bearing silicon-bonded hydrogen atoms are best cured with UV radiation having a wavelength of less than 365 nm; whereas UV radiation having a wavelength of 254 nm is most effective with compositions bearing sulfur-bonded hydrogen radicals. The source of ultraviolet radiation as defined above is not critical.

The method of this invention provides an article of manufacture which comprises a solid substrate, a tacky organopolysiloxane gel or grease adheringly disposed to at least a portion thereof and a continuous coating of a non-tacky solid organopolysiloxane which covers at least the tacky gel or grease.

In a preferred embodiment of the present invention the continuous coating of non-tacky solid organopolysiloxane is of sufficient strength and/or thickness to enable it to be easily compromised, such as by intentional puncturing, squeezing, cutting or shearing, to provide access to the organopolysiloxane gel or grease. Said access may be permanent, such as during the operation of a crimp-on electrical connector where subsequent repair of the compromised layer may not be desired; or temporary, such as during the invasive testing or repair of a coated circuit board where subsequent repair of the compromised layer may be desired or necessary. Repair of the compromised layer may be accomplished by repeating the process of this invention at the compromised site.

A preferred article of manufacture, which is provided by the process of this invention, comprises an electrical connector, such as a crimp-on connector comprising an outer insulating material and an inner metallic closure region to be mechanically deformed around the region of contact of a plurality of electrical conductors or a twist-on connector comprising an outer insulating material and an inner metallic recess into which a plurality of electrical conductors in electrical contact is fixedly placed; a tacky organopolysiloxane gel or grease adheringly disposed on said electrical connector in said metallic closure region or said metallic recess and a continuous non-tacky coating of an easily compromised solid organopolysiloxane on the exposed surface of said gel or grease. During the operation of said electrical connector the non-tacky coating of said solid organopolysiloxane is compromised, permitting the organopolysiloxane gel or grease to coat and protect at least a portion of the region of electrical contact of said electrical conductors.

The following examples are presented to further illustrate, but not to limit the invention.

All parts and percentages are by weight unless otherwise specified. Viscosities were measured in centipoise at 25° C. and were converted to pascal-seconds for this disclosure by multiplying by 0.001 and rounding off. Pressure was measured in mm Hg at room temperature and was converted to pascals by multiplying by 132.95 and rounding off.

EXAMPLE 1

Because of the fast curing rate possessed by the following composition, it is believed that this example sets forth the best mode for carrying out the present invention.

A homogeneous, liquid composition, convertible to the solid state by ultraviolet radiation, was prepared by mixing 100 parts of a trimethylsiloxane-endblocked polydiorganosiloxane consisting of 270 dimethylsiloxane units and 30 methylvinylsiloxane units per molecule and having a viscosity of 3.16 pascal-seconds at 25° C., 32 parts of a trimethylsiloxane-endblocked polymethylhydrogensiloxane having approximately 35 siloxane units per molecule and 2 parts of benzophenone. The composition had an Si—H/Si-vinyl ratio of 4.0.

A 0.5 g. blob of silicone stopcock grease comprising a trimethylsiloxane-endblocked polydimethylsiloxane fluid, a treated fume silica and boric acid was placed on a glass plate and covered with a few drops of the above composition. The glass plate with its disposed grease and continuous layer of convertible organopolysiloxane composition on the grease was then passed through two 178 mm zones of ultraviolet radiation at a distance of 80 mm from the U.V. source and at a speed of 508 mm/sec. to provide a 0.7 second total exposure time. The surface of the continuous coating was cured to a solid, easily penetrable, tack-free layer. The experiment was repeated at 406, 305 and 152 mm/sec. exposure speeds with similar results. When the experiment was repeated at 51 mm/sec. exposure speed (7 second exposure time)

the continuous layer was cured throughout to a tough, but still easily penetrable, tack-free coating.

The source of ultraviolet radiation for this experiment was two 0.5 m Hanovia® medium pressure lamps, each having a rated output of 690 watts in the ultraviolet and a radiation maximum at 366 mm, one lamp being placed behind each 178 mm aperature.

EXAMPLE 2

Four homogeneous, liquid compositions, convertible to the solid state by ultraviolet radiation, were prepared by mixing for each, 100 parts of a vinyldimethylsiloxane-endblocked polydiorganosiloxane consisting of approximately 144 dimethylsiloxane units and 3 methylvinylsiloxane units per molecule, 2 parts of benzophenone and 7, 13, 28 and 69 parts, respectively, of the methylhydrogenpolysiloxane described in Example 1. The four compositions had an Si—H/Si-vinyl ratio of 2.3, 4.7, 9.5 and 23, respectively. Four blobs of the silicone stopcock grease described in Example 1 were disposed on a glass plate and were each coated with one of these compositions and exposed to ultraviolet radiation for 7 seconds as in Example 1. All formulations, except the one having an Si—H/Si-vinyl ratio of 2.3 (which would require a longer exposure), were converted to a solid, tack-free suface on the surface of the stopcock grease.

EXAMPLE 3

A homogeneous, liquid organopolysiloxane composition, convertible by ultraviolet radiation to the solid state was prepared by mixing 95.5 parts of a trimethylsiloxane-endblocked polydiorganosiloxane having a viscosity of 1.2 pascal-seconds and containing approximately 240 dimethylsiloxane units and 13 methyl-3-mercaptopropylsiloxane units per molecule, 3.0 parts of a cyclopolymethylvinylsiloxane of the formula {$CH_3(CH_2=CH)SiO$}$_{4-6}$ and 1.5 parts of benzophenone.

When a few drops of the resulting composition is placed onto the surface of a 0.5 g. lump of tacky organopolysiloxane gel disposed on a glass plate and immediately thereafter exposed to the ultraviolet source as in Example 1 for 1.2 seconds, a tack-free surface is provided for the organopolysiloxane gel.

EXAMPLE 4

A homogeneous, liquid organopolysiloxane composition, convertible to the solid state by ultraviolet radiation, was prepared by mixing 25.6 parts of a mercaptopropyl-containing organopolysiloxane fluid having a viscosity of 6.8 pascal-seconds and consisting of 1 molar part of trimethylsiloxane units, 4 molar parts of dimethylsiloxane units, 11 molar parts of isopentylsiloxane units and 4 molar parts of 3-mercaptopropylsiloxane units, 1.9 parts of a cyclopolymethylvinylsiloxane of the formula {$CH_3(CH_2=CH)SiO$}$_{4-6}$ and 0.5 parts of benzophenone.

When a few drops of the resulting composition are placed onto the surface of a 0.5 g. blob of the silicone stopcock grease described in Example 1 disposed on a glass plate and immediately thereafter exposed to the ultraviolet source as in Example 1 for 1.2 seconds, results similar to those of Example 3 are obtained.

EXAMPLE 5

A homogeneous, liquid organopolysiloxane composition, convertible to the solid state by ultraviolet radiation, was prepared by mixing 47.4 parts of a vinyldimethylsiloxane-endblocked polydiorganosiloxane consisting of approximately 144 dimethylsiloxane units and approximately 3 methylvinylsiloxane units, 38.8 parts of a resin composed of $(CH_3)_3SiO_{1/2}$ units, $CH_2=CH(CH_3)_2SiO_{1/2}$ units and $SiO_{4/2}$ units, the ratio of the sum of the first two units to the last unit being in the range of 0.4:1 to 1.2:1, 12 parts of the polymethylhydrogensiloxane described in Example 1 and 1.8 parts of benzophenone.

When a few drops of the resulting composition are placed onto the surface of a lump of organopolysiloxane gel which has been disposed on a crimp-on electrical connector and exposed to ultraviolet radiation as in Example 1 for 2.3 seconds the gel is provided with a tack-free coating which can be compromised when the crimp-on electrical connector is used to hold a plurality of metallic connectors in electrical contact.

That which is claimed is:

1. A process for reducing the surface tack of an organopolysiloxane gel or grease, adheringly disposed on a substrate, said process comprising
   (I) applying to the surface of said disposed gel or grease a continuous layer of a liquid organopolysiloxane-composition which is convertible by ultraviolet radiation to the solid state and which consists essentially of a mixture of
      (a) an organopolysiloxane wherein an average of at least two of the organic radicals per molecule are silicon-bonded olefinic radicals selected from the group consisting of vinyl and butenylene and
      (b) a hydrogen-containing organopolysiloxane, free of aliphatic unsaturation, wherein the average molecule contains at least two hydrogen radicals selected from the group consisting of silicon-bonded hydrogen and mercaptoalkyl hydrogen, at least one of (a) and (b) having an average of more than two of said olefinic radicals and said hydrogen radicals, respectively, per molecule, and
   (II) exposing the applied continuous layer of convertible liquid to ultraviolet radiation until it is converted to a continuous layer of solid organopolysiloxane.

2. A process according to claim 1 wherein the liquid organopolysiloxane composition, convertible by ultraviolet radiation to the solid state, further contains a photosensitizing amount of a photosensitizer.

3. A process according to claim 2 wherein the liquid organopolysiloxane composition, convertible by ultraviolet radiation to the solid state, consists essentially of a homogeneous mixture of
   (a) a triorganosiloxane-endblocked polydiorganosiloxane fluid having a viscosity of from 0.5 to 50 pascal-seconds at 25° C. and containing up to 10 mol percent methylvinylsiloxane units and at least 90 mol percent dimethylsiloxane units,
   (b) a triorganosiloxane-endblocked polymethylhydrogensiloxane having approximately 35 silicon atoms, and
   (c) a photosensitizing amount of benzophenone, the amounts of (a) and (b) being sufficient to provide a mol ratio of silicon-bonded hydrogen radicals to silicon-bonded vinyl radicals of from 1.0 to 10.0.

4. A process according to claim 2 wherein the liquid organopolysiloxane composition, convertible by ultraviolet radiation to the solid state, consists essentially of a homogeneous mixture of (a) an organopolysiloxane selected from the group consisting of cyclopolymethylvinylsiloxanes having from 3 to 10 silicon atoms and 1,1'-oxy-bis(1-methyl-1-silacyclopentene), (b) a triorganosiloxane-endblocked polydiorganosiloxane fluid having a viscosity of from 0.5 to 50 pascal-seconds at 25° C. and containing up to 10 mol percent methyl-3-mercaptopropylsiloxane units and at least 90 mol percent dimethylsiloxane units, and (c) a photosensitizing amount of benzophenone, the amounts of (a) and (b) being sufficient to provide a mol ratio of mercaptopropyl radicals to olefinic radicals of from 0.5 to 5.0.

5. A process according to claims 3 or 4 wherein the continuous layer of solid organopolysiloxane is easily compromised to permit access to the organopolysiloxane gel or grease.

6. A process according to claim 5 wherein the substrate is a connector to be used for maintaining a plurality of metallic electrical conductors in electrical contact.

7. An article of manufacture prepared by the method of claim 1.

8. An article of manufactured prepared by the method of claim 6.

* * * * *